Feb. 7, 1928.
J. W. RIJNS
1,658,100
PIPE JOINT
Filed Dec. 23, 1926
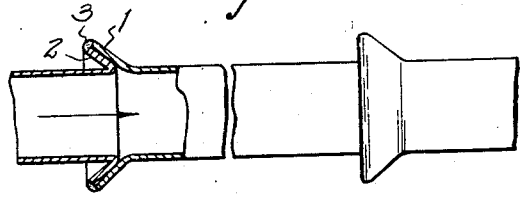
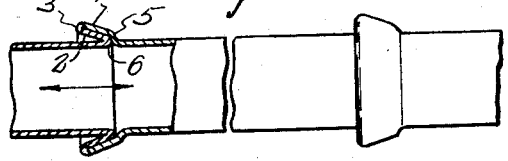
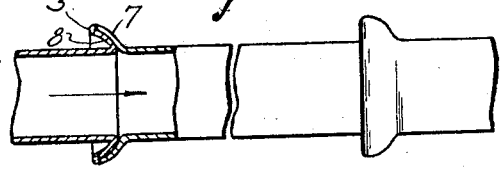

Patented Feb. 7, 1928.

1,658,100

UNITED STATES PATENT OFFICE.

JACOBUS WILLEBRORDUS RIJNS, OF HEERLEN, NETHERLANDS.

PIPE JOINT.

Application filed December 23, 1926, Serial No. 156,631, and in the Netherlands October 9, 1925.

The invention relates to the making of pipe joints by means of socket and weld.

Pipe joints by means of a socket were hitherto made principally in two ways. In the first and the older method the straight end of a pipe is entered into the socket end of the next pipe after which the space between the straight pipe end and the socket is filled with tow and lead.

This method is cumbrous and expensive. With the progress of the welding art recourse is had, in order to obtain a simpler joint, to directly welding the pipes together.

In this second method, in which a socket is also used for the joint, the socket directly engages the straight end of the next pipe. A "chamber" adapted to be filled up with tow and lead then remains and is superflous as the edge of this socket is welded directly to the pipe.

This second method has, however, the drawback that it must be carried out with great care. Even if the workman fulfills his task very accurately he cannot prevent the welding flames from affecting the pipe itself to some extent. Consequently the wall of the pipe at the place of the weld becomes thin and weak. Even small leaks may be caused by the welding operation. A second disadvantage of this method is that in pipes which are asphalted at the interior the local heating causes the asphalt of the pipe to run so that unprotected places are formed.

For these two reasons the conduits in which the pipes are connected according to this method contain many bad joints so that repeated repairs are necessary. It will be clear that this constitutes a serious drawback particularly when these conduits are located underground as the leakages and repairs give rise to very troublesome stagnation and this can only be overcome by a careful selection of the workman and intensive control.

The invention is designed to overcome these disadvantages.

The basic idea of the present invention consists in this that the weld is neither applied on, nor in close proximity to, the wall of the pipe. Consequently the welding flame cannot affect the pipe body and there will be no rise of temperature, or at most but a small rise, whereby any local running of the asphalt coating is prevented.

The socket joint is obtained by widening or bending out one end of the pipe conically somewhat as the usual socket but preferably at a smaller obtuse angle with the pipe body proper, while the corresponding pipe end is bent so as to form a collar. This collar makes the same angle with the pipe body as the socket and is of about equal length therewith. The collar is nested in and therefore fits closely into the socket thereby forming a stable connection of the sections without the use of bolts and the like and the dimensions may be so chosen that the edges of the socket and collar coincide. On or at this edge the weld is then applied.

In this way there is a certain distance between the welding place and the pipe body which distance may be chosen arbitrarily and, may be altered by changing the angle or dimension of the collar and socket.

In the accompanying drawings various embodiments are illustrated of sockets made according to the invention.

Figure 1 is a side view partly in section of one form of my pipe joint.

Fig. 2 is a like view of a modified form of joint, and

Fig. 3 a like view of a further modified form.

Figure 1 shows a simple form of socket 1 and collar 2 with weld 3 connecting the socket and collar together at their outer edges. The angle is so chosen that, while retaining the tightness of the weld, a certain movability of one pipe with respect to the other is obtained. This is important in the case of ground subsidence, repairs and the like.

The same joint is shown in Figure 2 in which, however, in order to avoid troublesome recesses in the inner wall of the conduit the socket 4 is bent twice to form a shoulder 5 whereby it engages also the bent edge 6 of the collar 2.

Figure 3 shows another embodiment of the joint. The socket 7 and collar 8 are here curved more or less so that the socket need not be bent twice for attaining approximately the same purpose.

These illustrated embodiments are not intended to give a complete summary of the possible embodiments seeing that the invention may be carried out in various other forms without departing from the stated basic idea.

I claim:

1. A pipe joint comprising two pipe sections each having a conical end portion, the end portion of one section extending back over the periphery thereof, and fitting the inner face of the conical end of the other section thereby forming a stable connection of the sections, and a weld binding the edges of the conical ends together.

2. A pipe joint comprising two pipe sections, one section having a flaring socket portion at the end thereof; the other section having a flaring collar on one end extending backward from the latter and nested within the socket end of the first section thereby forming a stable connection of the sections, and a weld binding the edges of the flaring collar and socket.

3. A pipe joint comprising two pipe sections, one section having a flaring end portion forming an obtuse angle with the said section, the other section having a flaring end forming an angle with said other section which is a supplement to the obtuse angle, the flaring ends of the two sections being in nested relation thereby forming a stable connection of the sections, and a weld binding the edges of the flaring ends.

4. A pipe joint comprising two pipe sections, one section having a shoulder on one end terminating in a conical socket, the other section having a collar formed thereon at an acute angle thereto, said collar being nested within the socket and abutting the shoulder thereof thereby forming a stable connection of the sections, and a weld binding the edges of the socket and collar.

In testimony whereof I affix my signature.

JACOBUS WILLEBRORDUS RIJNS.